(12) United States Patent
Kondyra et al.

(10) Patent No.: US 10,167,001 B2
(45) Date of Patent: Jan. 1, 2019

(54) GAP FILLER HAVING A REDUCED BULK

(71) Applicant: Alstom Transport Technologies, Saint-Ouen (FR)

(72) Inventors: Emmanuel Kondyra, La Rochelle (FR); Jean-Michel Delemotte, La Tremblade (FR)

(73) Assignee: Alstom Transport Technologies, Saint-Ouen (FR)

( * ) Notice: Subject to any disclaimer, the term of this patent is extended or adjusted under 35 U.S.C. 154(b) by 37 days.

(21) Appl. No.: 15/133,328

(22) Filed: Apr. 20, 2016

(65) Prior Publication Data

US 2016/0311448 A1 Oct. 27, 2016

(30) Foreign Application Priority Data

Apr. 21, 2015 (FR) ...................... 15 53540

(51) Int. Cl.
*B61D 47/00* (2006.01)
*B61D 23/02* (2006.01)
*B60P 1/43* (2006.01)

(52) U.S. Cl.
CPC .............. *B61D 47/00* (2013.01); *B60P 1/431* (2013.01); *B61D 23/02* (2013.01)

(58) Field of Classification Search
CPC .......... B61D 47/00; B61D 23/02; B60P 1/431
See application file for complete search history.

(56) References Cited

U.S. PATENT DOCUMENTS

| | | | | |
|---|---|---|---|---|
| 2,415,341 A | * | 2/1947 | Dean ...................... | B61D 23/02 105/427 |
| 2,709,410 A | * | 5/1955 | Fenton ................... | B61D 47/00 104/31 |
| 4,663,793 A | * | 5/1987 | Parramore ............ | B63B 27/143 14/2.5 |
| 5,676,515 A | * | 10/1997 | Haustein ................. | B60P 1/431 14/69.5 |

(Continued)

FOREIGN PATENT DOCUMENTS

| | | |
|---|---|---|
| EP | 0217265 A1 | 4/1987 |
| FR | 2873635 A1 | 2/2006 |

(Continued)

OTHER PUBLICATIONS

French Search Report dated Mar. 18, 2016 issued in corresponding French Patent Application No. 1553540.

*Primary Examiner* — Abigail A Risic
(74) *Attorney, Agent, or Firm* — Troutman Sanders LLP

(57) ABSTRACT

The gap filling device includes a movable ramp that is movable in a horizontal direction between a retracted position within a housing arranged under a floor of the rail vehicle, and a deployed position extending out of the housing. The ramp further has an upper surface that is accessible in the deployed position. The ramp includes lateral flanged edges extending over at least a portion of the length of the ramp, with each being movable between a first position, in which this lateral flanged edge extends vertically projecting outwards in relation to the upper surface of the ramp up to a first height, and a second position, in which the lateral flanged edge extends up to a second height that is lower than the first height.

15 Claims, 4 Drawing Sheets

(56) References Cited

U.S. PATENT DOCUMENTS

| | | | | |
|---|---|---|---|---|
| 6,039,528 | A * | 3/2000 | Cohn | B60P 1/4457 |
| | | | | 414/546 |
| 6,186,733 | B1 * | 2/2001 | Lewis | A61G 3/061 |
| | | | | 414/537 |
| 6,860,701 | B2 * | 3/2005 | Kiser | A61G 3/061 |
| | | | | 414/522 |
| 7,637,518 | B2 * | 12/2009 | Adair | B65G 69/30 |
| | | | | 280/163 |
| 7,793,596 | B2 * | 9/2010 | Hirtenlehner | B61D 23/02 |
| | | | | 105/443 |
| 8,926,254 | B2 * | 1/2015 | Pocobello | A61G 3/061 |
| | | | | 414/537 |
| 9,168,190 | B2 * | 10/2015 | Rasekhi | B60R 3/02 |
| 9,603,758 | B1 * | 3/2017 | Perez | A61G 3/061 |
| 2005/0217533 | A1 * | 10/2005 | Le Bellec | B61D 23/02 |
| | | | | 105/329.1 |
| 2008/0250966 | A1 * | 10/2008 | Hirtenlehner | B60R 3/02 |
| | | | | 105/444 |
| 2011/0023245 | A1 * | 2/2011 | Just | A61G 3/061 |
| | | | | 14/70 |
| 2014/0147237 | A1 * | 5/2014 | Rasekhi | B60R 3/02 |
| | | | | 414/537 |
| 2015/0013565 | A1 | 1/2015 | Guzman et al. | |

FOREIGN PATENT DOCUMENTS

| | | |
|---|---|---|
| JP | 2009292361 A | 12/2009 |
| WO | 2012/048759 A1 | 4/2012 |

* cited by examiner

FIG.1
FIG.2
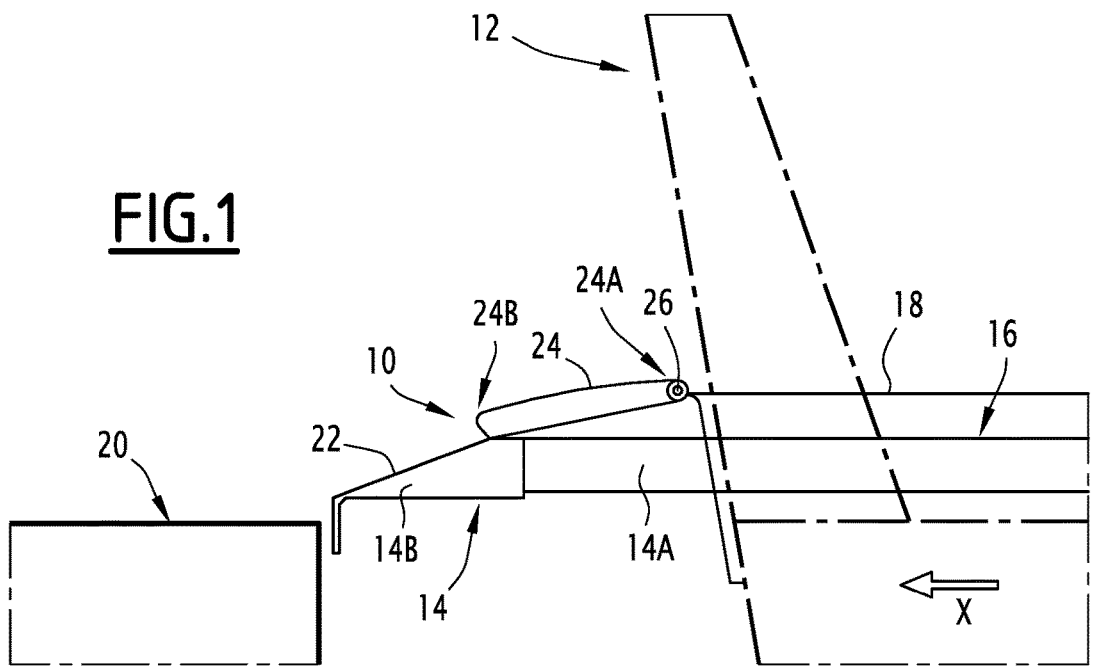
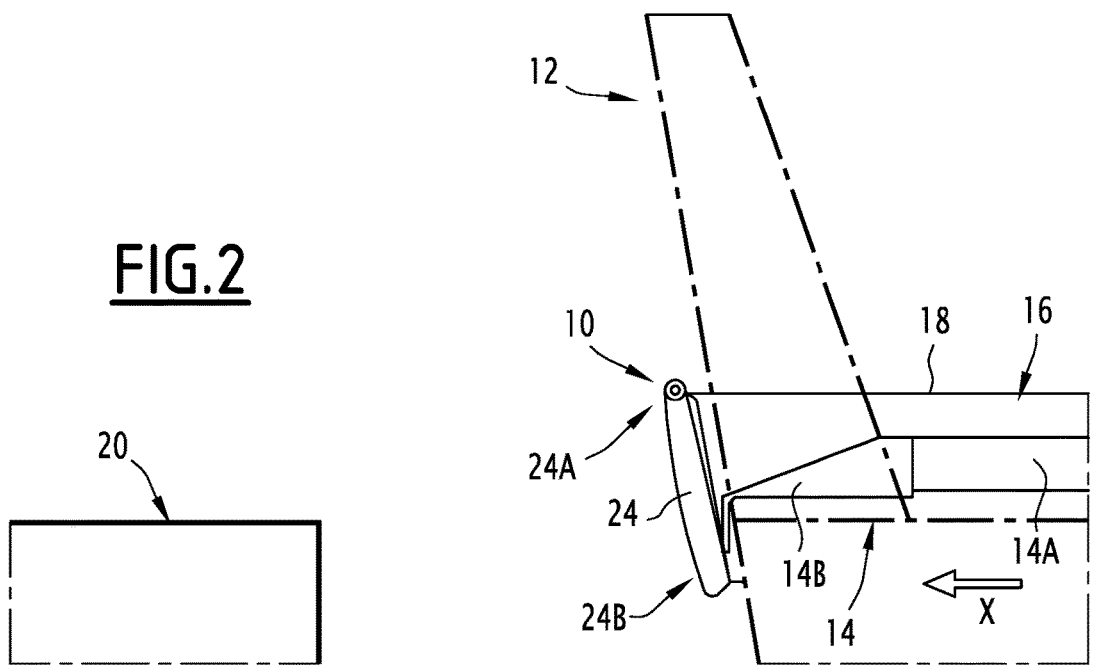

GAP FILLER HAVING A REDUCED BULK

CROSS-REFERENCE TO RELATED APPLICATION

This application claims priority to French Application No. FR 15 53540 filed Apr. 21, 2015. The entirety of this application is incorporated herein by reference in its entirety.

FIELD OF THE INVENTION

The present invention relates to a gap filling device, designed to be fitted on to a rail vehicle.

BACKGROUND

Already known in the state of the art, is a gap filling device that comprises a movable ramp that is movable in a horizontal direction between a retracted position within a housing arranged under a floor of the rail vehicle, and a deployed position extending out of the said housing. More particularly, the ramp is intended to be arranged in a door of the rail vehicle.

Thus, when the ramp is in the deployed position, it extends between the said door of the rail vehicle and a platform situated so as to be facing this door, and then serves as the means to facilitate access to the vehicle, in particular for persons with reduced mobility issues, and more particularly for individuals in wheelchairs.

Such a gap filling device, in a conventional manner, includes a guide and drive mechanism for guiding and driving the ramp in translational motion in the horizontal direction, fitted under the floor of the vehicle.

In certain cases, the ramp comprises lateral flanged edges that extend vertically projecting out from an upper surface of the ramp, in particular in order to secure the passage of wheelchairs/pushchairs, strollers and buggies or other like items over this ramp.

These lateral flanged edges are designed with the aim of preventing slippage of the wheels of wheelchairs/pushchairs or strollers, or of any other movement facilitating means to help move people with reduced mobility (for example a cane). However, the presence of such flanged edges increases the vertical dimensions of the ramp, which therefore requires a larger housing.

SUMMARY

The object of the invention is in particular to overcome this drawback by providing a ramp equipped with lateral flanged edges, whose overall dimensions and bulk are reduced.

To this end, the object of the invention in particular relates to a gap filling device designed to be fitted on to a rail vehicle, that includes a movable ramp that is movable in a horizontal direction between a retracted position within a housing arranged under a floor of the rail vehicle, and a deployed position extending out of the said housing, the said ramp comprising an upper surface that is accessible in the deployed position, characterized in that the ramp includes lateral flanged edges extending over at least a portion of the length of the ramp, with each being movable between a first position, in which this lateral flanged edge extends vertically projecting outwards in relation to the upper surface of the ramp up to a first height, and a second position, in which the lateral flanged edge extends up to a second height that is lower than the first height.

The lateral flanged edges according to the invention are movable between the first position, which corresponds to its use when the ramp is deployed, and the second position, which corresponds to a storage position for storing it in the housing. In this second position, the vertical dimensions of the lateral flanged edges, and therefore the vertical dimensions of the ramp, are reduced, to such extent that the spatial dimensions of the housing become limited.

A gap filling device according to the invention may further comprise one or more of the following characteristic features, taken into consideration alone or according to all technically possible combinations:

Each flanged edge is connected to the ramp by a pivot link defined about a pivot axis that is substantially parallel to the horizontal direction.

Each lateral flanged edge is extended by a lever-forming portion which is integrally attached to the flanged edge, the gap filling device comprising the pivoting means for pivoting the flanged edge about the pivot link.

The pivoting means includes a movable rod that is movable in translational motion in a direction forming a non-zero angle with the pivot axis, which cooperates with the lever-forming portion, and the rod moving means for moving the movable rod, which comprises a cylinder.

The rod moving means are common to all the movable rods, and comprise an eccentric cam, connected on the one hand to a piston of the cylinder, and on the other hand to each movable rod, in order to convert a movement of the piston into a movement of each movable rod.

Each flanged edge is connected to the respective lever-forming portion by forming an angle, in such a manner that the flanged edge linked to the lever-forming portion together present a transverse cross section of L-shaped form, with the pivot link being arranged in the proximity of the intersection between the flanged edge and the lever-forming portion.

Each flanged edge and the corresponding lever-forming portion are substantially coplanar, such that they serve as the extensions to one another; with the pivot link being arranged between the said flanged edge and the said lever-forming portion.

The gap filling device comprises a movable hatch that is movable between a closed position for closing off the housing when the ramp is in the retracted position, and an open position in which the hatch extends between the floor and the ramp in a deployed position.

The hatch in the open position rests on the upper surface of the ramp, with each flanged edge extending, in the horizontal direction, from the hatch to a free end of the ramp.

The height of a flanged edge is comprised between 0 cm and 6 cm.

The upper surface of the ramp is inclined at least in part.

BRIEF DESCRIPTION OF THE DRAWINGS

The invention will be better understood upon reviewing the description that follows given solely by way of example and with reference being made to the accompanying figures, in which:

FIGS. 1 and 2 are views in longitudinal cross section of a gap filling device according to an exemplary embodiment of the invention, wherein the ramp is respectively in the deployed position and in the retracted position;

DETAILED DESCRIPTION

Figure 3:
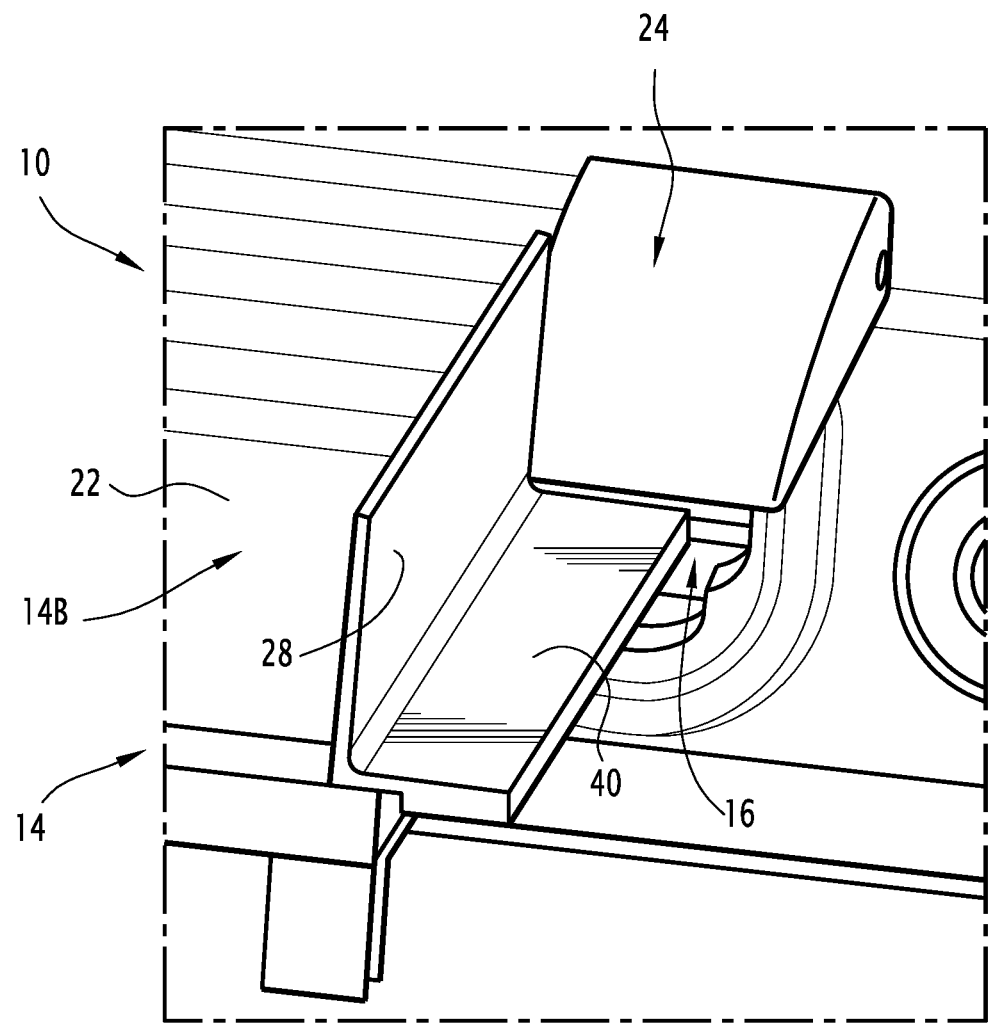
FIG. 3 is a perspective view of a lateral flanged edge of the ramp shown in FIG. 1 in the deployed position.

Visible in FIGS. 1 and 2, is a representation of a gap filling device 10 fitted on to a rail vehicle 12, and more particularly intended to be arranged under a door of this rail vehicle in order to facilitate access to the vehicle, in particular for persons with reduced mobility issues, and more particularly for individual users in wheelchairs.

The gap filling device 10 comprises a movable ramp 14 that is movable between a retracted position within a housing 16 arranged under a floor 18 of the rail vehicle (as has been represented in FIG. 2) and a deployed position extending out of the said housing 16 (as has been represented in FIG. 1).

In the deployed position, the ramp 14 is intended to extend from the rail vehicle 12 up to a platform 20 situated so as to be facing this door. The ramp 14 is deployed and retracted by conventional means of actuation, for example connected to the platform detecting means.

The ramp 14 comprises a first guiding and support portion 14A, that cooperates with a rail housed in the housing 16, in such a manner that the first portion 14A is guided in translational motion in a horizontal direction X. The gap filling device 10 in addition includes conventional drive means for driving this first portion 14A in translational motion along this horizontal direction X.

The ramp 14 also includes a second portion 14b comprising an upper surface 22 that is accessible in the deployed position, and on which passengers can move.

In accordance with the embodiment described, this upper surface 22 is at least in part inclined. More particularly, an inclined upper surface 22 will be chosen when the ramp 14 is intended to be deployed in front of a platform 20 whose height is lower than that of the floor 18.

However, by way of a variant, and in particular when the ramp 14 is intended to be deployed in front of a platform 20 whose height is substantially equal to that of the floor 18, the upper surface 22 may be selected to be substantially parallel to the horizontal direction X.

The gap filling device 10 also includes a movable hatch 24, that is movable between a closed position for closing off the housing 16 when the ramp 14 is in the retracted position (as has been represented in FIG. 2), and an open position in which the hatch 24 extends between the floor 18 and the ramp 14 (as has been represented in FIG. 1).

The hatch 24 has a top end 24A connected to the rail vehicle 26 by a pivot link having an axis that is perpendicular to the horizontal direction X, and a bottom end 24B that is free.

When the hatch 24 is in the open position, the free bottom end 24B rests on the upper surface 22 of the ramp 14. In other words, the hatch 24 in the open position forms a passage extending between the floor 18 and the upper surface 22 of the ramp 14. Depending on the configuration of this hatch 24, this passage may form an inclined surface between the floor 18 and the ramp 14, or by way of a variant, a step.

The movable door 24 is for example free to rotate about the pivot link 26. In this case, when the ramp 14 is deployed from its retracted position to its deployed position, it comes to cooperate with the movable hatch 24 and pushes it from its closed position to its open position.

In this case, when the ramp 14 returns into its retracted position, the hatch 24 returns to its closed position, for example under the effect of an elastic member, or by way of a variant simply under the effect of gravity.

According to another variant, the hatch 24 is motorized and its movement is controlled simultaneously with the movement of the ramp 14, or on a staggered basis.

Advantageously, the hatch 24 includes, at its bottom end 24B, the holding means for holding it in the closed position. These holding means are for example formed by the elastic member mentioned here above, or by way of a variant by an electromagnet.

Figure 4:
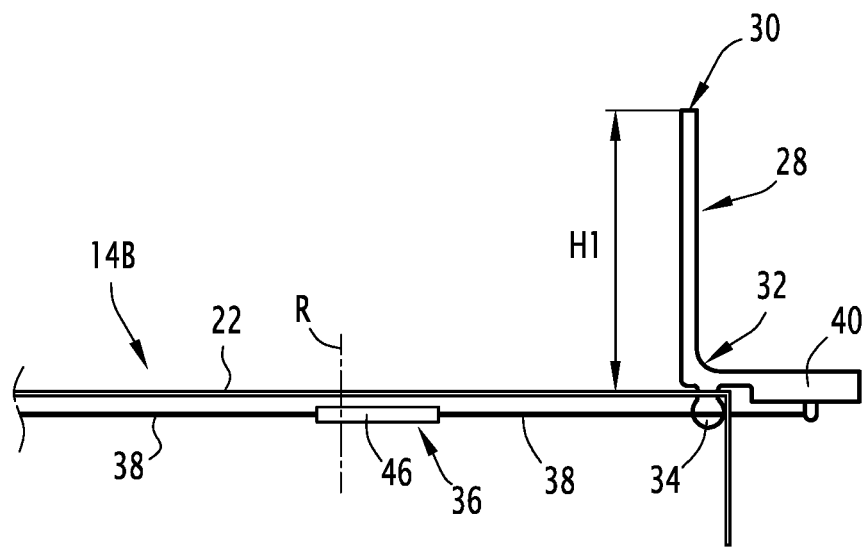
FIGS. 4 and 5 are schematic views in transverse cross section of the lateral flanged edge shown in FIG. 3, respectively in the first and second positions.
Figure 5:
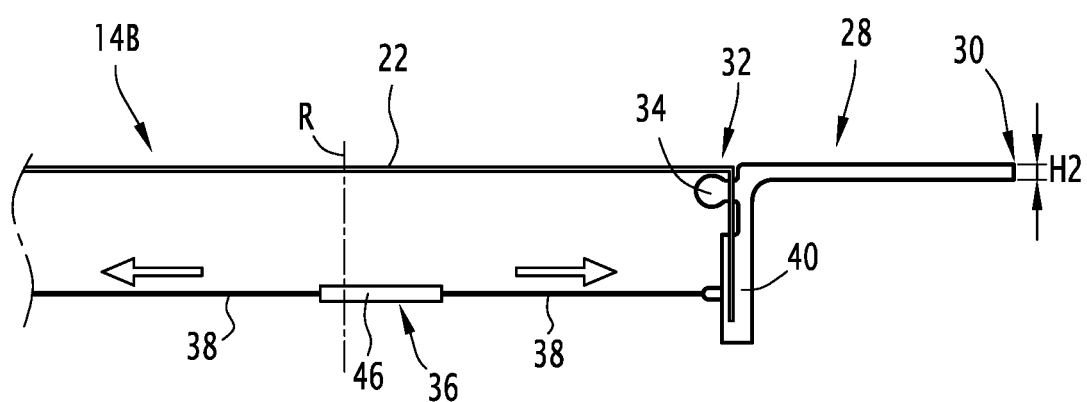

According to the invention, the ramp 14 comprises, on either side of its second portion 14B, in a direction perpendicular to the horizontal direction X, two lateral flanged edges 28, one of which is represented in the FIGS. 3 to 5.

The two lateral flanged edges 28 are similar, and more particularly are symmetrical, such that only one of them will be described here below.

Each lateral flanged edge 28 extends over a portion of the length of the ramp 14, and more particularly along the second portion 14B in the horizontal direction X, from a free end of this second portion 14B up to the hatch 24, as has been represented in FIG. 3.

According to one variant that has not been represented, the hatch 24 may also comprise second lateral flanged edges, each extending a respective one of the lateral flanged edge 28.

In the example described, each flanged edge 28 presents a generally rectangular shaped form, having a top edge 30 and a bottom edge 32. the flanged edge 28 is connected to the ramp 14 by means of a pivot link 34 defined about a pivot axis parallel to the horizontal direction X, this pivot link 34 being arranged in the proximity of the bottom edge 32.

Each lateral flanged edge 28 is movable between a first position, represented in FIG. 4, in which this lateral flanged edge 28 extends vertically projecting outwards in relation to the upper surface 22 of the ramp 14 up to a first height H1, and a second position, shown in FIG. 5, in which the lateral flanged edge extends up to a second height H2 that is lower than the first height H1.

In the present description, the first H1 and second H2 heights are considered from the upper surface 22 to the top edge 30 of the flanged edge 28.

In accordance with the example described, the second height H2 is zero, that is to say that the flanged edge 28 extends in the same plane as the upper surface 22, in the extension of this upper surface 22.

By way of a variant, the second height H2 could be negative, that is to say that the top edge 30 could be arranged below the upper surface 22.

According to another variant, the second height H2 may be positive but lower than the first height H1, in particular as it is the case in the variant embodiment shown in FIG. 7, which will be described later.

The gap filling device 10 in addition includes the pivoting means 36 for pivoting of the flanged edge 28 about the pivot link 34. These pivoting means 36 comprise a movable rod 38 that is movable in translational motion in a direction forming the pivoting axis, that is capable of driving the flanged edge 28 in rotation.

More particularly, the flanged edge 28 is extended by a portion 40 that forms a lever, and is integrally attached to the flanged edge 28, the pivot link 34 being located between this flanged edge 28 and this lever 40. In this case, the movable rod 38 cooperates with the lever 40, for example by means of a ball joint.

Figure 6:
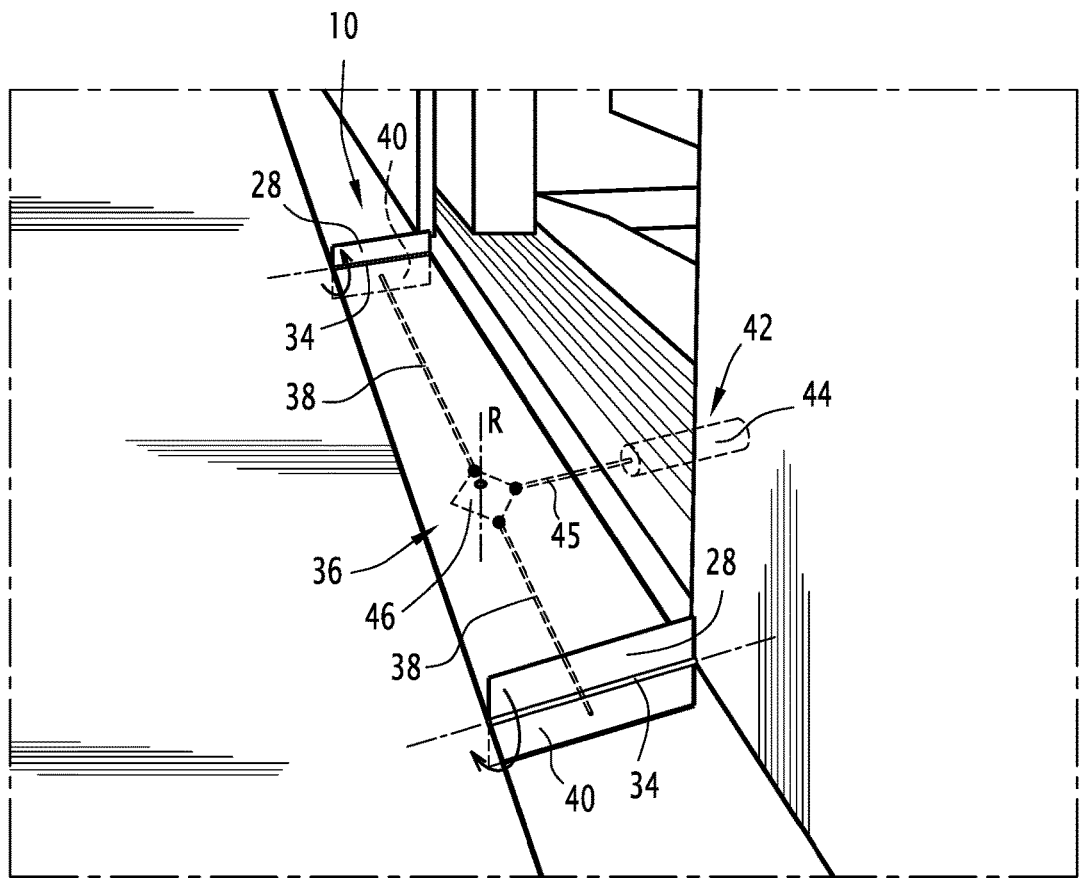
FIG. 6 is a perspective view of a gap filling device according to a variant embodiment.

The pivoting means 36 in addition includes the rod moving means 42 for moving the movable rod 38, comprising in particular a pneumatic cylinder 44. This cylinder 44 is seen in FIG. 6. Although this FIG. 6 relates to a variant embodiment, the pivoting means 36 are identical in the first embodiment shown in FIGS. 1 to 5.

For example, the rod moving means 42 comprise an eccentric cam 46, that is movable in rotation about an axis R that is shifted relative to an axis of thrust of the cylinder 44, and connected on the one hand to a piston 45 of this cylinder 44 and on the other hand to the movable rod 38, in order to convert a movement of this piston 45 into a movement of the movable rod 38.

Advantageously, the rod moving means 42 are common to all the movable rods 38, in a manner such that each movable rod 38 is connected to this same eccentric cam 46.

Thus, by activating the cylinder 44, the eccentric cam 46 is set in rotation about the axis R, thereby moving the rods 38 in one direction or the other, thereby causing the pivoting of the levers 40; with the flanged edges 28 thus entering into their first and second positions.

It should be noted that the flanged edges 28 are maintained in their first or second positions by the pivoting means 36, and can only pass from one to the other of these positions when the pivoting means 36 are activated.

In the example described in the FIGS. 3 to 5, each flanged edge 28 is connected to the corresponding lever 40 by forming an angle. Thus, the flanged edge 28 connected to the lever 40 together present a transverse cross section of L-shaped form, with the pivot link 34 being arranged in the proximity of the intersection between the flanged edge 28 and the lever 40.

Figure 7:
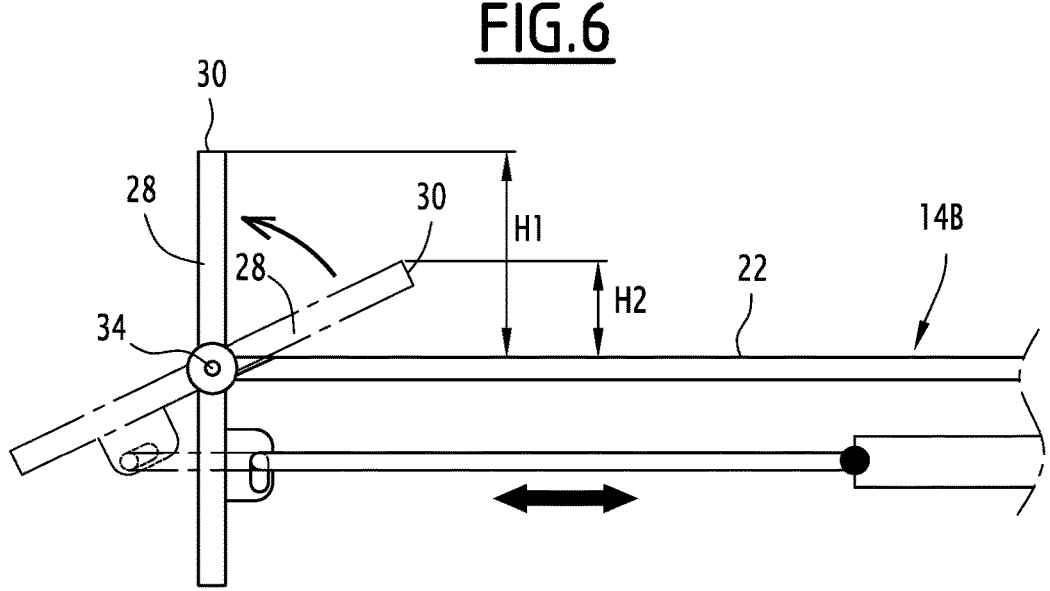
FIG. 7 is a partial transverse cross sectional view of the gap filling device shown in FIG. 6.

Represented in FIGS. 6 and 7, is a gap filling device 10 according to a variant embodiment. In these figures, elements that are analogous to those shown in the preceding figures are designated by identical reference numerals.

In accordance with this variant embodiment, each flanged edge 28 and the corresponding lever 40 are substantially coplanar, such that they serve as the extensions to one another. The pivot link 34 is then arranged between this flanged edge 28 and this lever 40.

In this case, as has been represented in FIG. 7, it is not possible to cause the flanged edge 28 to rotate until such time as it is found in the extension of the upper surface 22. However, it is possible to fold this flanged edge 28 over the upper surface 22, in which case there remains a positive second height H2 between this upper surface 22 and the top edge 30 of the flanged edge 28. However, this second rest height H2 remains lower than the first height H1, in a manner such that the spatial dimensions of the ramp 14 are reduced when the flanged edges 28 are in their second positions.

It is to be noted that the height of the flanged edge 28, that is to say the height H1 in the first position, is generally comprised between 0 and 60 mm.

The present invention is not limited to the embodiment previously described above, but may present various different variations.

For example, it is possible to provide for other forms for the flanged edge 28 and the lever 40.

Furthermore, according to another variant, it is also possible to provide for different pivoting means. For example, it is also possible to provide for a cam system that causes the passing of the flanged edges 28 from their first positions to their second positions when the ramp 14 moves from its retracted position to its deployed position. Thus, such pivoting means would not include any additional actuator 44 other than the actuating system for actuating the ramp 14.

The invention claimed is:

1. A gap filling device designed to be fitted on to a rail vehicle, the gap filling device comprising:
   a movable ramp that is movable in a horizontal direction between a retracted position within a housing arranged under a floor of the rail vehicle, and a deployed position extending out of the housing over a length, the movable ramp comprising:
      an upper surface that is accessible in the deployed position, and
      lateral flanged edges extending over at least a portion of the length of the movable ramp, with each being movable between a first position, in which this lateral flanged edge extends vertically projecting outwards in relation to the upper surface of the movable ramp up to a first height, and a second position, in which the lateral flanged edge extends up to a second height that is lower than the first height, and
   a movable hatch, formed by a unique plain element extending from a top end connected to the rail vehicle by a pivot link arranged above the housing, to a bottom end that is free, the movable hatch being movable between a closed position and an open position, such that:
      the movable hatch is in the closed position for closing off the housing when the movable ramp is in retracted position, and, in the closed position, the bottom end is under the housing, and
      in the open position, the movable hatch extends between the floor and the movable ramp in the deployed position, and the bottom end rests on the upper surface of the ramp.

2. The gap filling device according to claim 1, in which each of the lateral flanged edges are connected to the movable ramp by a pivot link defined about a pivot axis that is parallel to the horizontal direction.

3. The gap filling device according to claim 2, in which each of the lateral flanged edges are extended by a lever-forming portion which is integrally attached to the lateral flanged edge, the gap filling device comprising a pivoting member pivoting the lateral flanged edge about the pivot link.

4. The gap filling device according to claim 3, in which the pivoting member comprises:
   a movable rod that is movable in translational motion in a direction forming a non-zero angle with the pivot axis, which cooperates with the lever-forming portion, and
   a rod moving element moving the movable rod, the rod moving element comprising a cylinder having a piston.

5. The gap filling device according to claim 4, in which the rod moving element is common to all the movable rods, and comprises an eccentric cam, connected on the one hand to the piston of the cylinder and on the other hand to each movable rod, in order to convert a movement of the piston into a movement of each movable rod.

6. The gap filling device according to claim 3, in which each of the lateral flanged edges are connected to the respective lever-forming portion by forming an angle, in such a manner that the lateral flanged edge linked to the lever-forming portion together present a transverse cross section of L-shaped form, with the pivot link being arranged in the proximity of the intersection between the lateral flanged edge and the lever-forming portion.

7. The gap filling device according to claim 3, in which each of the lateral flanged edges and the corresponding lever-forming portion are substantially coplanar, such that they serve as the extensions to one another,
wherein the pivot link being arranged between the flanged edge and the lever-forming portion.

8. The gap filling device according to claim 1, in which the movable hatch in the open position rests on the upper surface of the movable ramp, with each of the lateral flanged edges extending, in the horizontal direction, from the movable hatch to a free end of the movable ramp.

9. The gap filling device according to claim 1, in which the height of each of the lateral flanged edges are comprised between 0 cm and 6 cm.

10. The gap filling device according to claim 1, in which the upper surface of the movable ramp is inclined at least in part.

11. The gap filling device according to claim 1, wherein the movable hatch is free to rotate about the pivot link, so that when the ramp is deployed from its retracted position to its deployed position, this ramp comes to cooperate with the movable hatch and pushes it from its closed position to its open position.

12. The gap filling device according to claim 1, wherein the movable hatch is motorized, and its movement is controlled simultaneously with the movement of the ramp, or on a staggered basis.

13. The gap filling device according to claim 1, wherein the movable hatch includes, at its bottom end, a holding member for holding it in the closed position.

14. The gap filing device according to claim 13, wherein the holding member is formed by an elastic member.

15. The gap filing device according to claim 13, wherein the holding member is formed by an electromagnet.

* * * * *